United States Patent Office 3,098,874
Patented July 23, 1963

3,098,874
PROCESS OF PREPARING 1-(4-HYDROXY PHENYL)-BUTANONE-(3)
Friedrich Porsch, Holzminden, Germany, assignor to Dragoco Spezialfabrik konz. Riech- und Aromastoffe Gerberding & Co., G.m.b.H., Holzminden (Weser), Germany, a company of Germany
No Drawing. Filed July 2, 1959, Ser. No. 824,480
Claims priority, application Germany July 3, 1958
8 Claims. (Cl. 260—590)

The present invention relates to a process of preparing compounds useful as perfume and flavoring agents, and more particularly to a process of preparing 1-(4-hydroxy phenyl)-butanone-(3).

In the past 1-(4-hydroxy phenyl)-butanone-(3) has always been prepared by multi-step processes only. Expensive starting materials were required, and the yields were quite low.

For instance, anisaldehyde and acetone were condensed to yield anisal acetone which was hydrogenated to form anisyl acetate (4-methoxy benzyl acetone) and was converted subsequently into 1-(4-hydroxy phenyl)-butanone-(3) by means of an ether cleavage. The ether cleavage is carried out with hydrobromic acid, aluminum chloride, or similar compounds. The yields, however, were very low.

Furthermore, the expensive p-hydroxy benzaldehyde has been condensed with acetone to form p-hydroxy benzal acetone. It is known, however, that condensation of aromatic hydroxy aldehydes proceeds very unsatisfactorily and with low yields. The resulting condensation product must then by hydrogenated in order to obtain 1-(4-hydroxy phenyl)-butanone-(3).

It is one object of the present invention to prepare 1-(4-hydroxy phenyl)-butanone-(3) in a single step process and by using inexpensive and easily available starting materials.

Other objects of the present invention and advantageous features thereof will become apparent as the description proceeds.

In principle the process of producing 1-(4-hydroxy phenyl)-butanone-(3) according to the present invention in one single reaction step and by using inexpensive and easily available starting materials consists in condensing phenol with methyl vinyl ketone at a low temperature, preferably at a temperature of between about −5° C. and +5° C., with the addition of Friedel-Crafts catalysts, such as aluminum chloride, boron trifluoride, or ferric chloride, and in the presence of an inert solvent. Preferably nitro benzene or 1,1,2,2-tetrachloroethane are used as solvents as they are unaffected in this reaction.

The yield in the process according to the present invention amounts to 70% to 80% by weight calculated for reacted phenol. By this new reaction 1-(4-hydroxy phenyl)-butanone-(3) has become a readily available compound.

The reaction of phenol with vinyl methyl ketone to form 1-(4-hydroxy phenyl)-butanone-(3) not only takes place under the influence of Friedel-Crafts catalysts, but also under the conditions of acid catalysis.

Thereby the reaction may be carried out in non-polar as well as in polar solvents, the non-polar solvents being preferred.

Acids which can be used in the process according to the present invention are all acids which are commonly used for organic reactions catalyzed by acids as they are known to those skilled in the art. The following acids are given as examples without, however, being limited thereto: Phosphoric acid, polyphosphoric acids alone or in mixture with phosphoric acid, sulfuric acid alone or in mixture with phosphoric acid. A mixture of phosphoric acid and formic acid may also be used as well as other inorganic or organic acids or mixtures thereof. Friedel-Crafts catalysts may also be added to the acids mentioned above, such as aluminum chloride or boron trifluoride.

The temperature may be in the range between −10° C. and +50° C.

The present invention represents a highly valuable improvement of the heretofore known process, and considerably simplifies working up of the reaction mixture, thereby increasing considerably the efficiency of the process.

The process of preparing 1-(4-hydroxy phenyl)-butanone-(3) according to the present invention may be illustrated by the following examples without, however, being limited thereto.

*Example 1.*—80 g. of anhydrous aluminum chloride are dissolved in 400 g. of nitro benzene while stirring. 47 g. of phenol are added thereto. The reaction mixture is cooled to a temperature between −5° C. to +5° C., and a mixture of 50 g. of methyl vinyl ketone and 100 g. of nitro benzene is added dropwise thereto at said temperature within about one hour. The mixture is then stirred for another four hours at about 0° C., poured on ice water, filtered, and washed with dilute hydrochloric acid and water. The phenols are extracted by shaking with 5% sodium hydroxide solution, and are separated by fractional distillation into phenol and 1-(4-hydroxy phenyl)-butanone-(3). Fractional distillation proceeds without difficulty due to the differences in boiling points of the two compounds. The resulting crude 1-(4-hydroxy phenyl)-butanone-(3) is recrystallized either from water or from a benzene-benzine mixture. The melting point after recrystallization is 82–83° C. The yield is: 32 g. to 34 g. of 1-(4-hydroxy phenyl)-butanone-(3) (about 82–85% by weight calculated for reacted phenol). 7 g. to 8 g. of phenol are recovered.

*Example 2.*—80 g. of anhydrous aluminum chloride are suspended in 600 g. of 1,1,2,2-tetrachloroethane, while stirring. 47 g. of phenol are added thereto. A mixture of 50 g. of methyl vinyl ketone and 200 g. of 1,1,2,2-tetrachloroethane are added dropwise thereto at a temperature between −5° C. and −10° C. within 1½ hours. Stirring of the reaction mixture at about 0° C. is continued for another 4 hours. The mixture is then worked up as described in Example 1. The yield is: 25 g. of 1-(4-hydroxy phenyl)-butanone-(3) having a melting point of 82–83° C. (about 79% by weight calculated for reacted phenol). 14 g. of phenol are recovered.

*Example 3.*—The same method is used and the same amounts of reactants and solvents are employed as described in Example 2. However, in place of aluminum chloride, 72.5 g. of boron trifluoride etherate are added as Friedel-Crafts catalyst. The yield is: 21 g. of 1-(4-hydroxy phenyl)-butanone-(3) having a melting point of 82–83° C. (about 70% by weight calculated for reacted phenol). 17 g. of phenol are recovered.

*Example 4.*—95 g. of vinyl methyl ketone are added to 94 g. of phenol and 100 g. of 85% phosphoric acid at 20° C. within 45 minutes while stirring. The temperature rises exothermically to about 40° C. and is maintained for 2 hours. The filtered reaction product is washed with water until neutral and is subjected to fractional distillation. The yield is: 23 g. of 1-(4-hydroxy phenyl)-butanone-(3) having a melting point of 81–82° C. (about 64% by weight calculated for reacted phenol). 58 g. of phenol are recovered.

*Example 5.*—94 g. of phenol and 80 g. of 100% phosphoric acid are heated to 50° C. and 70 g. of vinyl methyl ketone are carefully added dropwise thereto within 1 hour, the temperature of the reaction mixture being maintained at 50° C. Stirring is continued for another hour. The filtered reaction product is washed with water until neutral and is subjected to fractional distillation. The yield is: 33 g. of 1-(4-hydroxy phenyl)-butanone-(3) (about 67–68% by weight calculated for reacted phenol). 45 g. of phenol are recovered.

*Example 6.*—70 g. of methyl vinyl ketone are added at 15–20° C. to 94 g. of phenol, 100 g. of 85% phosphoric acid, and 15 g. of concentrated sulfuric acid within 40 minutes while stirring and gently cooling. Stirring at 20° C. is continued for another 4 hours. The filtered reaction product is washed with water until neutral and subjected to fractional distillation. The yield is: 25 g. of 1-(4-hydroxy phenyl)-butanone-(3) having a melting point of about 81.5–82.5° C. (about 80% by weight calculated for reacted phenol). 63 g. of phenol are recovered.

*Example 7.*—A mixture of 70 g. of vinyl methyl ketone and 100 g. of toluene is added at 35–40° C. to 282 g. of phenol, 65 g. of polyphosphoric acid, 35 g. of 85% phosphoric acid, and 150 g. of toluene within 2 hours. Stirring is continued for another 3 hours. The filtered reaction product is washed with water until neutral and is worked up as described in Example 1. The yield is: 51 g. of 1-(4-hydroxy phenyl)-butanone-(3) (about 76% by weight calculated for reacted phenol). 215 g. of phenol are recovered.

*Example 8.*—A mixture of 70 g. of methyl vinyl ketone and 100 g. of toluene is added at −10° C. to 282 g. of phenol, 250 g. of toluene and 50 g. of concentrated sulfuric acid within one hour while stirring. The mixture is stirred at −5° C. for another 3 hours. The filtered reaction product is washed with water until neutral and subjected to fractional distillation. The yield is: 73 g. of 1-(4-hydroxy phenyl)-butanone-(3) having a melting point of 81–82° C. (about 83–84% by weight calculated for reacted phenol). 195 g. of phenol are recovered.

*Example 9.*—A mixture of 70 g. of methyl vinyl ketone and 100 g. of 95% ethanol is added at 0° C. to 282 g. of phenol, 250 g. of 95% ethanol, and 50 g. of concentrated sulfuric acid within one hour while vigorously stirring. Stirring is continued at a temperature of +10° C. for another 3 hours. The filtered reaction product is washed with water until neutral and subjected to fractional distillation. The yield is: 18 g. of 1-(4-hydroxy phenyl)-butanone-(3) having a melting point of 81.5–82.5° C. (about 46% by weight calculated for reacted phenol). 243 g. of phenol are recovered.

*Example 10.*—A mixture of 70 g. of methyl vinyl ketone and 100 g. of toluene is added at 10° C. to 282 g. of phenol, 250 g. of toluene, and 77 g. of 65% sulfuric acid within one hour. Stirring is continued at 20° C. for 3 hours. The filtered reaction product is washed with water until neutral and is subjected to fractional distillation. The yield is: 38 g. of 1-(4-hydroxy phenyl)-butanone-(3) (about 52–53% by weight calculated for reacted phenol). 210 g. of phenol are recovered.

*Example 11.*—10 g. of boron trifluoride are introduced into 30 g. of 85% phosphoric acid. (The corresponding amount of boron trifluoride etherate may also be used.) 188 g. of phenol and 150 g. of toluene are added thereto. A mixture of 70 g. of methyl vinyl ketone and 100 g. of toluene is then added at a temperature between 20° C. and 40° C. within 4 hours while stirring vigorously. Stirring is continued at about 30° C. for four hours. The filtered reaction product is washed with water until neutral and subjected to fractional distillation. The yield is: 33 g. of 1-(4-hydroxy phenyl)-butanone-(3) (about 56–57% by weight calculated for reacted phenol). 130 g. of phenol are recovered.

Of course, many changes and variations in the catalysts used, the reaction conditions, temperature, and duration employed, the method of working up and of purifying the reaction products, and the like may be made in accordance with the principles set forth herein.

I claim:

1. In a process of preparing 1-(4-hydroxy phenyl) butanone-(3), the step which comprises reacting phenol with methyl vinyl ketone in the presence of a catalyst selected from the group consisting of a Friedel-Crafts catalyst, phosphoric acid, polyphosphoric acid, sulfuric acid, mixtures of said acids, and mixtures of phosphoric acid and formic acid, and of an inert solvent at a temperature between about −10° C. and about +50° C.

2. The process according to claim 1, wherein the inert solvent is a member of the group consisting of nitro benzene, tetrachloroethane, toluene, and ethanol.

3. The process according to claim 1, wherein the reaction is carried out at a temperature between −10° C. and +5° C.

4. The process according to claim 1, wherein the Friedel-Crafts catalyst is aluminum chloride.

5. The process according to claim 1, wherein the Friedel-Crafts catalyst is boron trifluoride.

6. In a process of preparing 1-(4-hydroxy phenyl) butanone-(3), the step which comprises reacting phenol with methyl vinyl ketone in the presence of phosphoric acid and an inert solvent at a temperature between about −10° C. and about +50° C.

7. In a process of preparing 1-(4-hydroxy phenyl) butanone-(3), the step which comprises reacting phenol with methyl vinyl ketone in the presence of sulfuric acid and an inert solvent at a temperature between about −10° C. and about +50° C.

8. In a process of preparing 1-(4-hydroxy phenyl) butanone-(3), the step which comprises reacting phenol with methyl vinyl ketone in the presence of a mixture of phosphoric acid and sulfuric acid and an inert solvent at a temperature between about −10° C. and about +50° C.

References Cited in the file of this patent

UNITED STATES PATENTS 2,010,828    Rothrock _____ Aug. 13, 1935

FOREIGN PATENTS 1,033,650    Germany _____ July 10, 1958

OTHER REFERENCES

Thomas: Anhydrous Aluminum Chloride in Organic Chemistry, page 480 (1941), (Copy in Library.)